(12) United States Patent
Okada et al.

(10) Patent No.: US 7,231,466 B2
(45) Date of Patent: Jun. 12, 2007

(54) DATA MIGRATION METHOD FOR DISK APPARATUS

(75) Inventors: Koichi Okada, Odawara (JP); Akiyori Tamura, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/452,974

(22) Filed: Jun. 15, 2006

(65) Prior Publication Data

US 2006/0236006 A1 Oct. 19, 2006

Related U.S. Application Data

(63) Continuation of application No. 10/661,574, filed on Sep. 15, 2003, now Pat. No. 7,130,941.

(30) Foreign Application Priority Data

Jun. 24, 2003 (JP) .............................. 2003-178976

(51) Int. Cl.
*G06F 13/14* (2006.01)
*G06F 12/00* (2006.01)
(52) U.S. Cl. .............................. 710/5; 710/36; 710/74; 711/161
(58) Field of Classification Search ...................... None
See application file for complete search history.

(56) References Cited

U.S. PATENT DOCUMENTS

| | | | |
|---|---|---|---|
| 3,771,137 A | 11/1973 | Barner et al. | |
| 4,025,904 A | 5/1977 | Adney et al. | |
| 4,710,868 A | 12/1987 | Cocke et al. | |
| 5,155,845 A | 10/1992 | Beal et al. | |
| 5,408,465 A | 4/1995 | Gusella et al. | |
| 5,459,857 A | 10/1995 | Ludlam et al. | |
| 5,504,882 A | 4/1996 | Chai et al. | |
| 5,548,712 A | 8/1996 | Larson et al. | 714/7 |
| 5,680,580 A | 10/1997 | Beardsley et al. | |
| 5,680,640 A | 10/1997 | Ofek et al. | 710/19 |
| 5,758,118 A | 5/1998 | Choy et al. | 711/114 |

(Continued)

FOREIGN PATENT DOCUMENTS

EP 1130514 A2 9/2001

(Continued)

OTHER PUBLICATIONS

White Paper, "Networking Attached Storage in the Data Protection Environment", Sony Electronics Inc., Feb. 2002, pp. 1-23.

(Continued)

*Primary Examiner*—Ilwoo Park
(74) *Attorney, Agent, or Firm*—Mattingly, Stanger, Malur & Brundidge, P.C.

(57) ABSTRACT

Data migration can be executed between new and old disk apparatuses without changing the disk definition of a host computer. A switch having the function of online data migration is provided between the host computer and the old disk apparatus, data are copied to the new disk apparatus while the disk apparatus is accessed continuously by the host computer. If a SCSI command for identifying disk apparatuses is issued by the host computer after data migration, the response of the old disk apparatus is sent back.

81 Claims, 9 Drawing Sheets

U.S. PATENT DOCUMENTS

| | | |
|---|---|---|
| 5,835,954 A | 11/1998 | Duyanovich et al. ........ 711/162 |
| 5,870,537 A | 2/1999 | Kern et al. |
| 5,895,485 A | 4/1999 | Loechel et al. |
| 5,917,723 A | 6/1999 | Binford |
| 5,956,750 A | 9/1999 | Yamamoto et al. |
| 5,978,890 A | 11/1999 | Ozawa et al. |
| 6,012,123 A | 1/2000 | Pecone et al. |
| 6,098,129 A | 8/2000 | Fukuzawa et al. |
| 6,108,748 A | 8/2000 | Ofek et al. ................. 711/112 |
| 6,173,374 B1 | 1/2001 | Heil et al. |
| 6,195,730 B1 | 2/2001 | West |
| 6,219,753 B1 | 4/2001 | Richardson |
| 6,230,239 B1 | 5/2001 | Sakaki et al. ............... 711/112 |
| 6,240,486 B1 | 5/2001 | Ofek et al. ................. 711/112 |
| 6,240,494 B1 | 5/2001 | Nagasawa et al. |
| 6,247,099 B1 | 6/2001 | Skazinski et al. |
| 6,247,103 B1 | 6/2001 | Kern et al. |
| RE37,305 E | 7/2001 | Chang et al. |
| 6,341,329 B1 | 1/2002 | LeCrone et al. |
| 6,356,977 B2 | 3/2002 | Ofek et al. |
| 6,374,327 B2 | 4/2002 | Sakaki et al. |
| 6,389,459 B1* | 5/2002 | McDowell .................. 709/216 |
| 6,446,141 B1 | 9/2002 | Nolan et al. |
| 6,446,175 B1 | 9/2002 | West et al. |
| 6,453,392 B1* | 9/2002 | Flynn, Jr. ................... 711/151 |
| 6,457,139 B1 | 9/2002 | D'Errico et al. .............. 714/5 |
| 6,484,173 B1 | 11/2002 | O'Hare et al. |
| 6,490,659 B1 | 12/2002 | McKean et al. |
| 6,523,096 B2 | 2/2003 | Sanada et al. |
| 6,529,976 B1 | 3/2003 | Fukuzawa et al. |
| 6,553,408 B1 | 4/2003 | Merrell et al. |
| 6,598,134 B2 | 7/2003 | Ofek et al. |
| 6,622,220 B2 | 9/2003 | Yoshida et al. |
| 6,640,278 B1 | 10/2003 | Nolan et al. |
| 6,640,291 B2 | 10/2003 | Fujibayashi et al. ........ 711/162 |
| 6,647,387 B1 | 11/2003 | McKean et al. |
| 6,647,474 B2 | 11/2003 | Yanai et al. |
| 6,647,476 B2 | 11/2003 | Nagasawa et al. |
| 6,654,830 B1 | 11/2003 | Taylor et al. |
| 6,654,831 B1 | 11/2003 | Otterness et al. |
| 6,675,258 B1 | 1/2004 | Bramhall et al. |
| 6,681,303 B1 | 1/2004 | Watabe et al. |
| 6,681,339 B2 | 1/2004 | McKean et al. |
| 6,684,310 B2 | 1/2004 | Anzai et al. |
| 6,687,758 B2 | 2/2004 | Craft et al. ................. 709/250 |
| 6,708,232 B2 | 3/2004 | Obara |
| 6,718,404 B2 | 4/2004 | Reuter et al. |
| 6,745,281 B1 | 6/2004 | Saegusa |
| 6,772,315 B1 | 8/2004 | Perego |
| 6,799,255 B1 | 9/2004 | Blumenau et al. |
| 6,816,948 B2 | 11/2004 | Kitamura et al. ............ 711/152 |
| 6,826,778 B2 | 11/2004 | Bopardikar et al. ........ 725/145 |
| 6,851,020 B2 | 2/2005 | Matsumoto et al. |
| 6,857,057 B2 | 2/2005 | Nelson et al. |
| 6,883,064 B2 | 4/2005 | Yoshida et al. |
| 6,973,549 B1 | 12/2005 | Testardi |
| 6,976,103 B1 | 12/2005 | Watanabe et al. |
| 6,976,134 B1 | 12/2005 | Lolayekar et al. |
| 7,051,121 B2 | 5/2006 | Ohno et al. |
| 2001/0000818 A1 | 5/2001 | Nagasawa et al. |
| 2001/0050915 A1 | 12/2001 | O'Hare et al. |
| 2001/0052018 A1 | 12/2001 | Yokokura |
| 2001/0054133 A1 | 12/2001 | Murotani et al. |
| 2002/0003022 A1 | 1/2002 | Csida et al. |
| 2002/0004857 A1 | 1/2002 | Arakawa et al. |
| 2002/0004890 A1 | 1/2002 | Ofek et al. ................. 711/161 |
| 2002/0019908 A1 | 2/2002 | Reuter et al. |
| 2002/0019920 A1 | 2/2002 | Reuter et al. |
| 2002/0019922 A1 | 2/2002 | Reuter et al. |
| 2002/0019923 A1 | 2/2002 | Reuter et al. |
| 2002/0026558 A1 | 2/2002 | Reuter et al. |
| 2002/0029326 A1 | 3/2002 | Reuter et al. |
| 2002/0065864 A1 | 5/2002 | Hartsell et al. |
| 2002/0087544 A1 | 7/2002 | Selkirk et al. |
| 2002/0103889 A1 | 8/2002 | Markson et al. |
| 2002/0112113 A1 | 8/2002 | Karpoff et al. |
| 2002/0124108 A1 | 9/2002 | Terrell et al. |
| 2002/0133735 A1 | 9/2002 | McKean et al. |
| 2002/0156887 A1 | 10/2002 | Hashimoto |
| 2002/0156984 A1 | 10/2002 | Padovano |
| 2002/0156987 A1 | 10/2002 | Gajjar et al. |
| 2002/0178335 A1 | 11/2002 | Selkirk et al. |
| 2002/0188592 A1 | 12/2002 | Leonhardlt et al. |
| 2002/0194523 A1 | 12/2002 | Ulrich et al. ................ 714/4 |
| 2003/0037071 A1 | 2/2003 | Harris et al. |
| 2003/0051109 A1 | 3/2003 | Cochran |
| 2003/0056038 A1 | 3/2003 | Cochran |
| 2003/0079018 A1 | 4/2003 | Lolayekar et al. |
| 2003/0079019 A1 | 4/2003 | Lolayekar et al. |
| 2003/0093541 A1 | 5/2003 | Lolayekar et al. |
| 2003/0093567 A1 | 5/2003 | Lolayekar et al. |
| 2003/0097607 A1 | 5/2003 | Bessire |
| 2003/0101228 A1 | 5/2003 | Busser et al. |
| 2003/0115218 A1 | 6/2003 | Bobbit et al. |
| 2003/0115432 A1 | 6/2003 | Blessener et al. |
| 2003/0126327 A1 | 7/2003 | Pesola et al. |
| 2003/0130833 A1* | 7/2003 | Brownell et al. ............. 703/23 |
| 2003/0145168 A1 | 7/2003 | LeCrone et al. |
| 2003/0145169 A1 | 7/2003 | Nagasawa et al. .......... 711/117 |
| 2003/0158999 A1 | 8/2003 | Hauck et al. |
| 2003/0167419 A1 | 9/2003 | Yanai et al. |
| 2003/0182525 A1 | 9/2003 | O'Connell et al. ......... 711/162 |
| 2003/0188233 A1* | 10/2003 | Lubbers et al. ............. 714/100 |
| 2003/0200387 A1 | 10/2003 | Urabe et al. |
| 2003/0204597 A1 | 10/2003 | Arakawa et al. |
| 2003/0204700 A1 | 10/2003 | Biessener et al. |
| 2003/0212854 A1 | 11/2003 | Kitamura et al. |
| 2003/0212863 A1 | 11/2003 | Jiang et al. |
| 2003/0221077 A1 | 11/2003 | Ohno et al. |
| 2003/0229645 A1 | 12/2003 | Nelson et al. |
| 2003/0237019 A1 | 12/2003 | Kleiman et al. ............... 714/6 |
| 2004/0003022 A1 | 1/2004 | Garrison et al. |
| 2004/0028043 A1 | 2/2004 | Maveli et al. |
| 2004/0049553 A1 | 3/2004 | Iwamura et al. |
| 2004/0054850 A1 | 3/2004 | Fisk |
| 2004/0054866 A1 | 3/2004 | Blumenau et al. |
| 2004/0064610 A1 | 4/2004 | Fukuzawa et al. |
| 2004/0064641 A1 | 4/2004 | Kodama |
| 2004/0068637 A1 | 4/2004 | Nelson et al. |
| 2004/0088417 A1 | 5/2004 | Bober et al. |
| 2004/0111485 A1 | 6/2004 | Mimatsu et al. |
| 2004/0123180 A1 | 6/2004 | Soejima et al. |
| 2004/0139237 A1 | 7/2004 | Pangal et al. |
| 2004/0143832 A1 | 7/2004 | Yamamoto et al. |
| 2004/0148443 A1 | 7/2004 | Achiwa et al. |
| 2004/0172510 A1 | 9/2004 | Nagashima et al. |
| 2004/0230980 A1 | 11/2004 | Koyama et al. |
| 2004/0260875 A1 | 12/2004 | Murotani et al. |
| 2004/0260899 A1* | 12/2004 | Kern et al. .................. 711/162 |
| 2004/0260966 A1 | 12/2004 | Kaiya et al. |
| 2005/0010734 A1 | 1/2005 | Soejima et al. ............. 711/163 |
| 2005/0010743 A1 | 1/2005 | Tremblay et al. |
| 2005/0033878 A1 | 2/2005 | Mogi et al. |
| 2005/0081009 A1 | 4/2005 | Williams et al. ............ 711/163 |
| 2005/0138184 A1 | 6/2005 | Amir |
| 2005/0240741 A1 | 10/2005 | Nagasawa et al. |

FOREIGN PATENT DOCUMENTS

| | | |
|---|---|---|
| JP | 09288547 | 11/1997 |
| JP | 10508967 | 9/1998 |
| JP | 10283272 | 10/1998 |
| JP | 11184641 | 7/1999 |
| JP | 2000293317 | 10/2000 |

| | | |
|---|---|---|
| JP | 2001067187 | 3/2001 |
| JP | 2001249853 | 9/2001 |
| JP | 2001331355 | 11/2001 |
| JP | 2002157091 | 5/2002 |
| JP | 2002230246 | 8/2002 |
| WO | 9709676 | 3/1997 |
| WO | 03023640 | 3/2003 |
| WO | 03027886 | 4/2003 |
| WO | 03030431 | 4/2003 |
| WO | 03030449 | 4/2003 |

OTHER PUBLICATIONS

S. Sicola, "SCSI-3 Fault Tolerant Controller Configurations Utilizing SCC & New Event Codes", High Availability Study Group, Doc. No. X3T10 95-312r3, Rev. 3.0, Feb. 28, 1996, pp. 1-4.

"SAN Virtualization Guidelines", DataCore Software Corporation, 2000, pp. 1-9.

Introduction to Storage Pooling, Consolidation Storage Resources with DataCore SANsymphony Software White Paper, DataCore Software, updaged Jul. 2003, pp. 1-8.

JP 10-508967 (PCT equivalent WO 97/09676).

"SANRAD Application Note: Migrating Individual Servers to an iSCSI SAN", APP-004-01, SANRAD 2003; pp. 1-15.

"White Paper—Celerra Data Migration Service (CDMS)", EMC Corporation, Jan. 2002, pp. 1-13.

P. Sarker, et al "Internet Protocol Storage Area Networks", IBM Systems, Journal, vol. 42, No. 2, 2003, pp. 218-231.

E. Anderson, et al, "Hippodrome: Running Circles Around Storage Administration", Hewlett-Packard Laboratories, pp. 14.

SANRAD Application Note: Data Migration Solution Transferring Data Between Storage Systems Over Fibre-Channel or SCSI Connections, APP-003-03, SANRAD 2003, pp. 1-9.

* cited by examiner

FIG. 1a
FIG. 1b
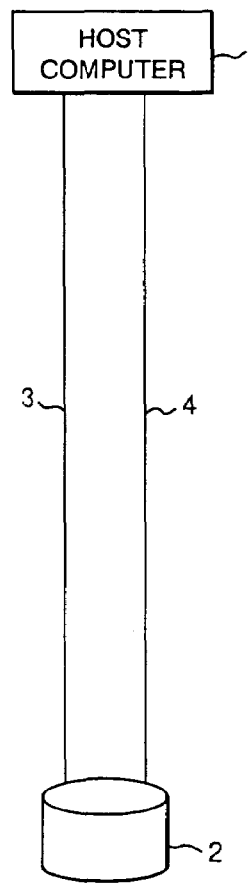
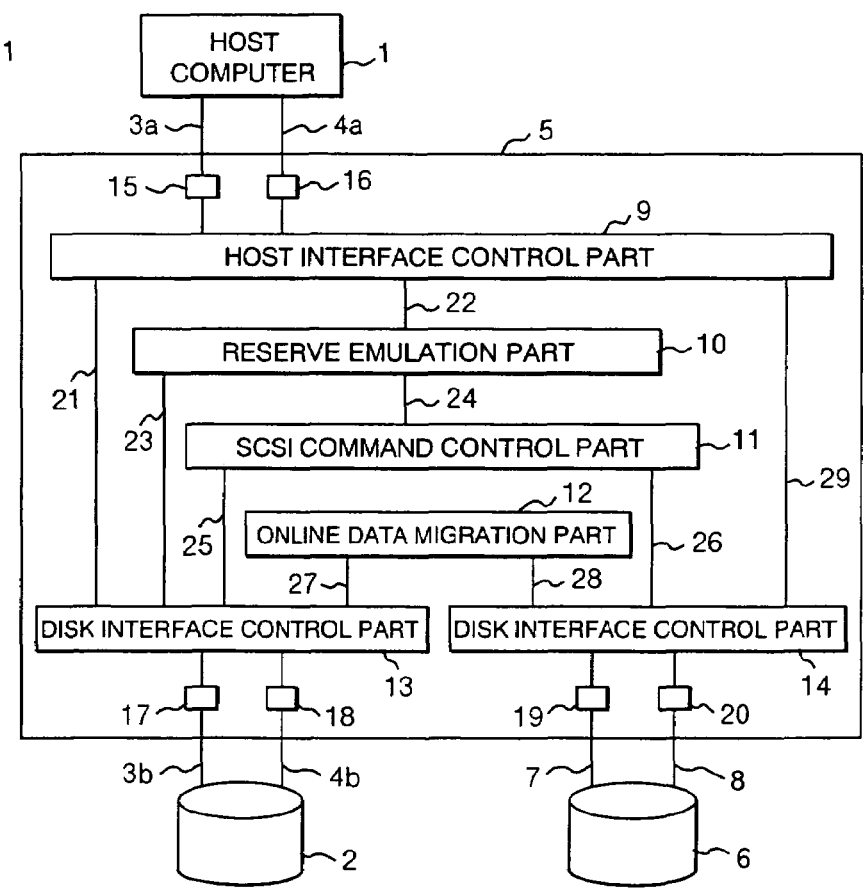

FIG. 7

| OPERATION CODE | PAGE CODE | SCSI COMMAND NAME | KIND |
|---|---|---|---|
| 00H | | Test Unit Ready | -- |
| 01H | -- | Rezero Unit | -- |
| 03H | -- | Request Sense | -- |
| 04H | -- | Format Unit | -- |
| 07H | -- | Reassign Blocks | -- |
| 08H | -- | Read | -- |
| 0AH | -- | Write | -- |
| 0BH | -- | Seek | -- |
| 12H | -- | Inquiry (Standard) | DISK INHERENT |
| 12H | 83H | Inquiry (Device Identification) | DISK INHERENT |
| 12H | 01H~7FH | Inquiry (ASCII Information) | DISK INHERENT |
| 12H | 00H | Inquiry (Supported vital product data pages) | DISK INHERENT |
| 12H | 80H | Inquiry (Unit serial number) | DISK INHERENT |
| 12H | EXCEPTING ABOVE CITED | Inquiry (Reserved or Vendor-specific) | DISK INHERENT |
| : | : | : | : |
| 1AH | 00H | Mode Sense (Vendor-specific) | DISK INHERENT |
| 1AH | 20H~3EH | Mode Sense (Vendor-specific) | DISK INHERENT |
| 1AH | 01H | Mode Sense (Read-write error recovery mode) | -- |
| 1AH | 02H | Mode Sense (Disconnect-reconnect) | -- |
| 1AH | 03H | Mode Sense (Format device mode) | -- |
| 1AH | 04H | Mode Sense (Rigid disk geometry mode) | -- |
| 1AH | 05H | Mode Sense (Flexible disk mode) | -- |
| 1AH | 07H | Mode Sense (Verify error recover mode) | -- |
| : | : | : | : |
| 1BH | -- | Start/Stop Unit | -- |
| 1CH | -- | Receive Diagnostic Results | -- |
| 1DH | -- | Send Diagnostic | -- |
| : | : | : | : |
| EXCEPTING ABOVE CITED | | COMMAND NOT FOUND IN SCSI STANDARD | DISK INHERENT |

EXAMPLE OF CONFIGURATION OF DISK APPARATUS

DATA MIGRATION METHOD FOR DISK APPARATUS

The present application is a continuation of application Ser. No. 10/661,574, filed Sep. 15, 2003 now U.S. Pat. No. 7,130,941; which claims priority of Japanese Patent Application Serial Number 2003-178976, the contents of which are incorporated herein by reference.

BACKGROUND OF THE INVENTION

1. Field of the Invention

The present invention relates to a computer system and a method for controlling interface commands of a disk apparatus for online data migration technology of the disk apparatus and, more particularly, to migration technology for the contents of the disk apparatus for storing task process data while a host computer continues to process task data.

2. Description of the Related Art

Conventionally, in the case of updating a newly connected disk apparatus (new disk apparatus) from a disk apparatus (old disk apparatus or migration source disk apparatus) functioning as an outside storage device, in order to utilize continuously data that are processed up to now, data of the old disk apparatus shall be moved to the new disk apparatus (migration). In such a case, as a conventional general method, a method of storing the contents of the current disk apparatus once in a backup file of a tape unit or the like and then restoring after the disk apparatus was exchanged has been employed. Otherwise, there has been known a method for connecting the new disk apparatus, as well as a conventional old disk, to a host computer and then storing copy data of the old disk apparatus in the new disk apparatus by the host computer. Here, these methods stop the tasks of the host computer for a long period of time. Operation for stopping tasks for such a long period of time cannot be accepted as the tasks of the most modern data center characterizing non-stop operation.

For a method for improving such a condition, a patent document 1 (Japanese published unexamined patent application No. 2001-249853) discloses a method for executing data migration from the old disk apparatus to the new disk apparatus by connecting the new disk apparatus to a switch provided between the host computer and the old disk apparatus. According to this data migration method, a unit for copying data from the old disk apparatus to the new disk apparatus while the disk apparatus of the host computer is continuously accessed is provided in the switch (or a storage system). However, in this data migration method, the old disk apparatus and the host computer that is used are necessarily disconnected for a while and then the switch having the above cited online data migration function shall be provided. Here, if the number of access paths between the host computer and the old disk apparatus is one, the computer system shall be halted.

For another method, a patent document 2 (Japanese published unexamined patent application No. 11-184641) discloses a method for executing data migration without stopping while plural access paths are included between the host computer and the disk apparatus and at least one access path is continuously maintained. This data migration method is made and used by a changing-over path function provided on the host computer, i.e., a method for changing-over access paths dynamically by managing two or more access paths between the host computer and the disk apparatus on the host computer. The changing-over path function of the host computer, however, may not work properly for a disk apparatus having different interface specification as a process task of a specified disk apparatus. The reason is because a SCSI response of the disk apparatus is utilized inherently in order to identify automatically plural access paths for the disk apparatus (referred to a logical unit in the SCSI code). Namely, for such a response, there may be caused a problem in which access is denied if consistency is not recognized in disk inherent information for an interface command.

[Patent document 1]
Japanese published unexamined patent application No. 2001-249853

[Patent document 2]
Japanese published unexamined patent application No. 11-184641

BRIEF SUMMARY OF THE INVENTION

In the above cited conventional technology, at the time of changing-over an old disk apparatus to a new disk apparatus, since consistency between old disk (apparatus) inherent information maintained by a host computer as configuration information and new disk (apparatus) inherent information is not firmly assured, the host computer closes an access path by judging that the new disk apparatus fails due to this inconsistency, thus a problem in which the computer system goes down is caused as a result.

The object of the present invention is to provide interface command control technology (control system and computer system) of data migration of the disk apparatus capable of executing non-stop data migration without requiring stop operation of accessing the disk apparatus by the host computer due to the above cited inconsistency in accordance with data migration procedures from old disk apparatus to the new disk apparatus.

Another object of the present invention is to provide interface command control technology for data migration capable of updating (exchanging) a differently specified disk apparatus by avoiding causing failure due to a disk inherent information change in accordance with migration from the old disk apparatus to the new disk apparatus.

Another object of the present invention is to provide interface command control technology for data migration of a computer system having high availability and maintaining redundancy of the access path by performing correctly an alternate path function during and after data migration.

Still another object of the present invention is to provide interface command control technology for data migration of the disk apparatus capable of executing data migration smoothly without stopping migration for the disk apparatus shared by plural host computers.

Still another object of the present invention is to provide the computer system adapting the interface command control method of the above cited disk apparatus.

In order to solve the above cited objects, the present invention, in a method for controlling an interface command of a magnetic disk apparatus of a computer system including one or more host computers, a disk apparatus (old disk apparatus) connected prior to the host computers, and a disk apparatus (new disk apparatus) newly connected to the host computers via a switch, includes the steps of changing-over and connecting the old disk apparatus to the host computers via the switch being connected to the new disk apparatus, executing data migration from the old disk apparatus to the new disk apparatus via the switch, identifying a command for inquiring disk identification as an interface command from the host computers and a command for inputting and outputting data, and sending the command for inquiring the disk identification to the old disk apparatus.

Further, data migration from the old disk apparatus to the new disk apparatus is executed by an online data migration function of the switch.

Furthermore, the old disk apparatus and the new disk apparatus operate by a SCSI command from one or more host computers, and a SCSI command utilized by the host computers for identifying the disk apparatus exchanges data so as to utilize as the same disk apparatus before and after data migration.

Furthermore, one or more host computers share at least one old disk apparatus, and the old disk apparatus is reused for storing data after data migration.

BRIEF DESCRIPTION OF THE DRAWINGS

The present invention will become more apparent from the detailed description taken in conjunction with the accompanying drawings and thus are not limited to the present invention in which:

FIGS. 1A and 1B are a block diagram of a computer system for explaining data migration embodiment of the present invention;

FIG. 7 is a SCSI command kind table;

DETAILED DESCRIPTION OF THE PREFERRED EMBODIMENTS

Figure 2:
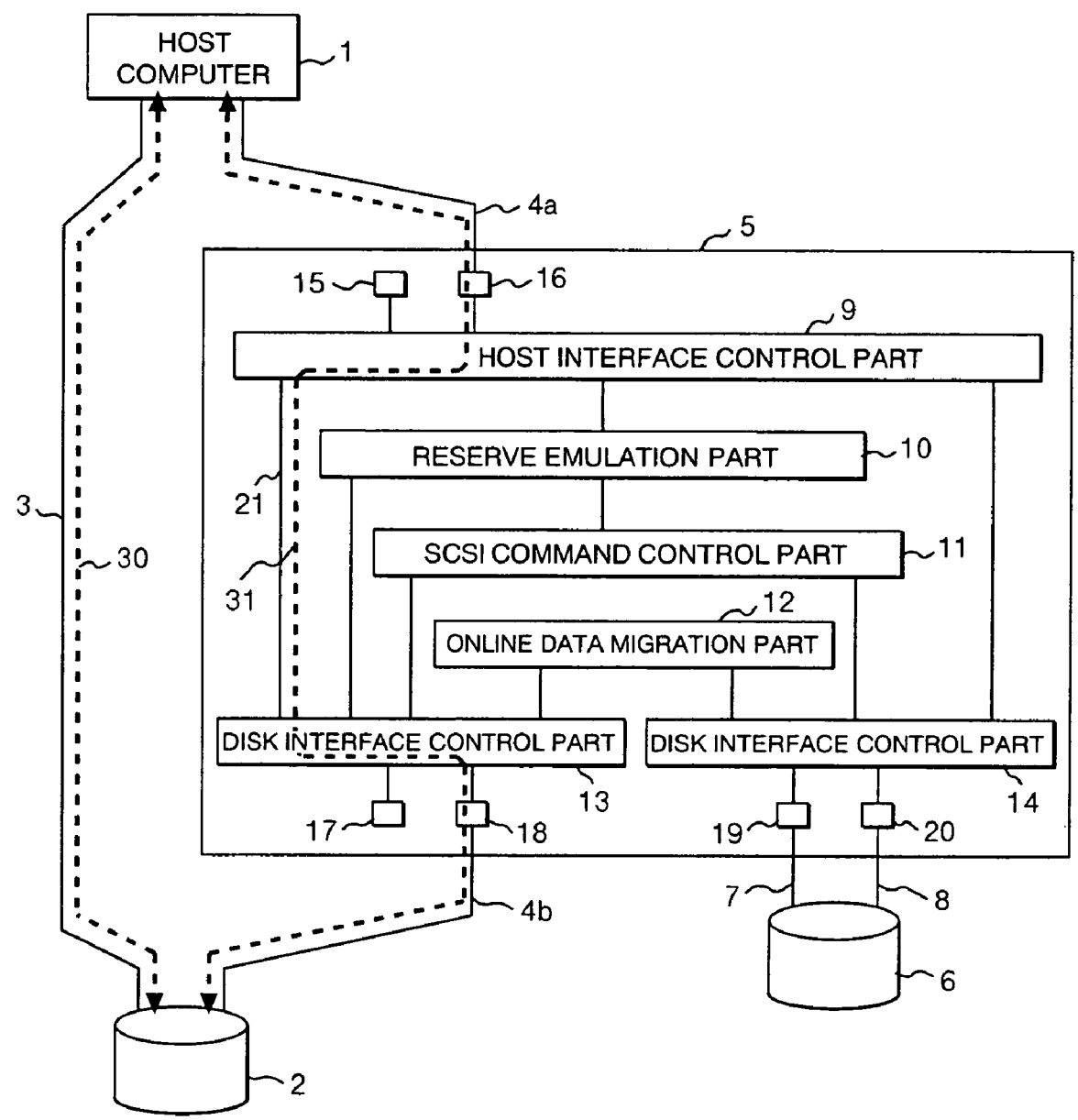
FIG. 2 exemplifies process of inserting a switch of the present invention between a host computer and an old disk apparatus.
Figure 3:
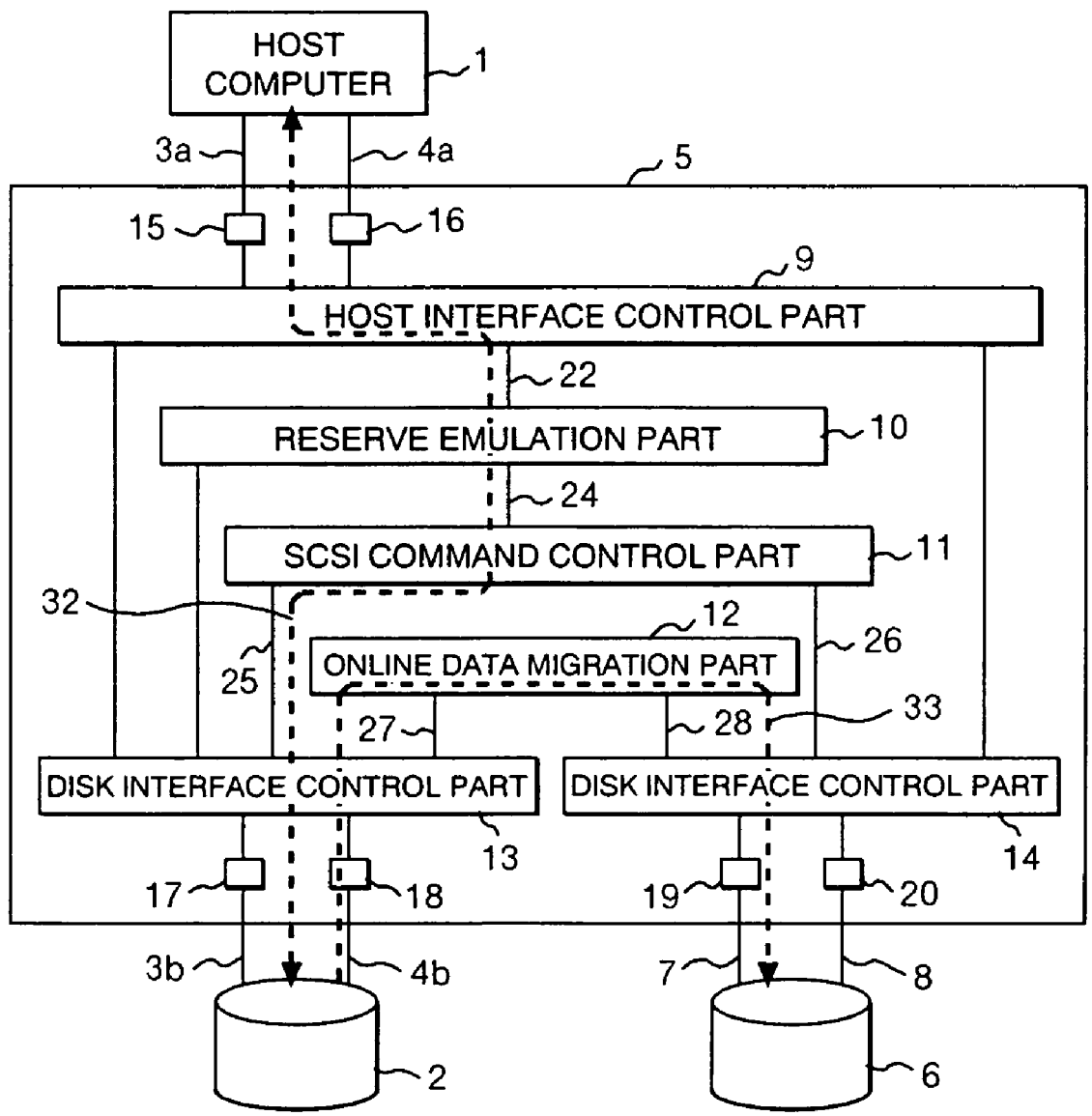
FIG. 3 exemplifies a data flow during online data migration process of the present invention.

In the following part, a computer system and an interface command control method of a disk apparatus of the present invention are explained with reference to the embodiments of the present invention of FIGS. 1 to 9.

(1) Computer System Diagram

FIG. 1A exemplifies a computer system diagram before data migration. The host computer 1 is connected to an old disk apparatus 2 via access paths 3 and 4. The access paths 3 and 4 are fiber channels or parallel SCSI based on the SCSI standard.

FIG. 1B exemplifies a computer system diagram after migration. A switch 5 is connected to the host computer 1 via access paths 3a and 4a and the old disk apparatus 2 via access paths 3b and 4b. The access paths 3a and 4a and the access paths 3b and 4b are fiber channels and the parallel SCSI based on the SCSI standard. These access paths 3a and 4a and access paths 3b and 4b are access paths after switching connection.

Further, the switch 5 is connected to a new disk apparatus 6 via access paths 7 and 8. The access paths 7 and 8 are fiber channels or the parallel SCSI based on the SCSI standard.

Here, the number of host computers shall not be limited by the present invention, when this invention is made and used, since the present invention is data migration from the old disk apparatus 2 to the new disk apparatus 6.

A host interface control part 9 is connected to the access paths 3a and 4a via ports 15 and 16 and controls SCSI command transmitting to and receiving from the host computer 1. Further, the host interface control part 9 is connected to disk interface control parts 13 and 14 and a reserve emulation part 10 via internal paths 21, 29, and 22 respectively.

A disk interface control part 13 is connected to the access paths 3b and 4b via ports 17 and 18, and controls SCSI command transmitting to and receiving from the old disk apparatus 2. Further, a disk interface control part 13 is connected to the reserve emulation part 10, a SCSI command control part 11, and an online data migration part 12 via internal paths 23, 25, and 27 respectively.

A disk interface control part 14 is connected to the access paths 7 and 8 via ports 19 and 20 and controls SCSI command transmitting to and receiving from the new disk apparatus 6. Further, the disk interface control part 14 is connected to the SCSI command control part 11 and the online data migration part 12 via internal paths 26 and 28 respectively.

The reserve emulation part 10 receives SCSI commands, which are issued by the host computer 1, from the host interface control part 9 via an internal path 22 and executes exclusive access control to access from the host computer in accordance with the SCSI commands with regard to reserve and release (the number of host computers to be connected is not limited, although one host computer 1 is indicated in FIG. 1B).

The SCSI command control part 11 receives the SCSI commands from the host computer 1 via the host interface control part 9 and the reserve emulation part 10, and gives the SCSI commands to the old disk apparatus 2 and the new disk apparatus 6 via the disk interface control part 13 and the disk interface control part 14. Further, response information from the old disk apparatus 2 and the new disk apparatus 6 is given to the host computer 1 via the paths in reverse. The SCSI command control part 11 has the function of classifying the SCSI commands from the host computer 1 and giving them to the old disk apparatus 2 or the new disk apparatus 6. The operation therefor is explained hereinafter with reference to FIGS. 3 and 4.

The online data migration part 12 of FIG. 1B has the function of copying automatically data stored in the disk apparatus, reads data via the disk interface control part 13 from the old disk apparatus 2, and writes data via the disk interface control part 14 in the new disk apparatus 6, when data migration is executed.

(2) Interface Command Control Procedure for Data Migration

Figure 5:
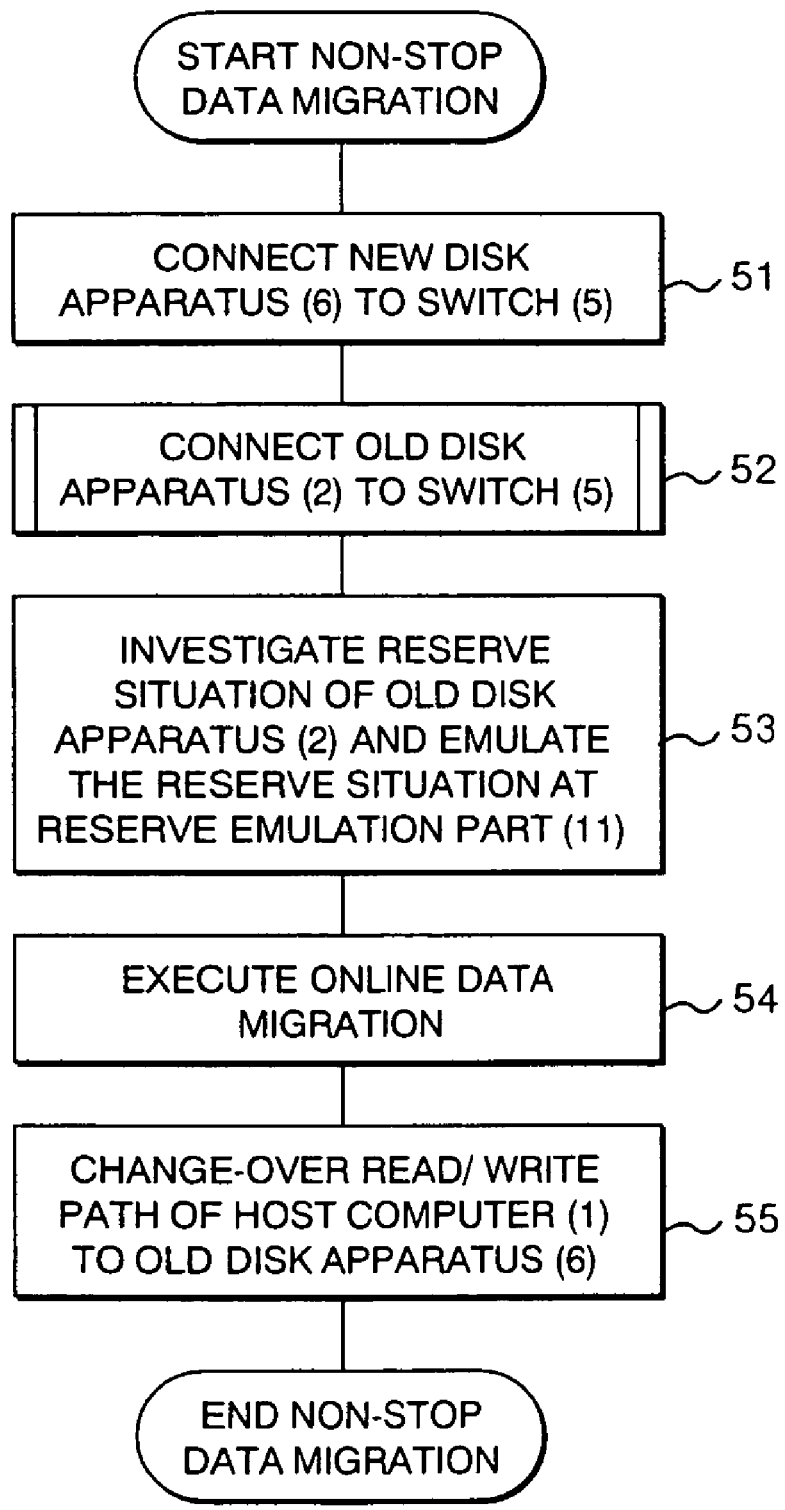
FIG. 5 is a flowchart for explaining data migration process of the present invention.
Figure 6:
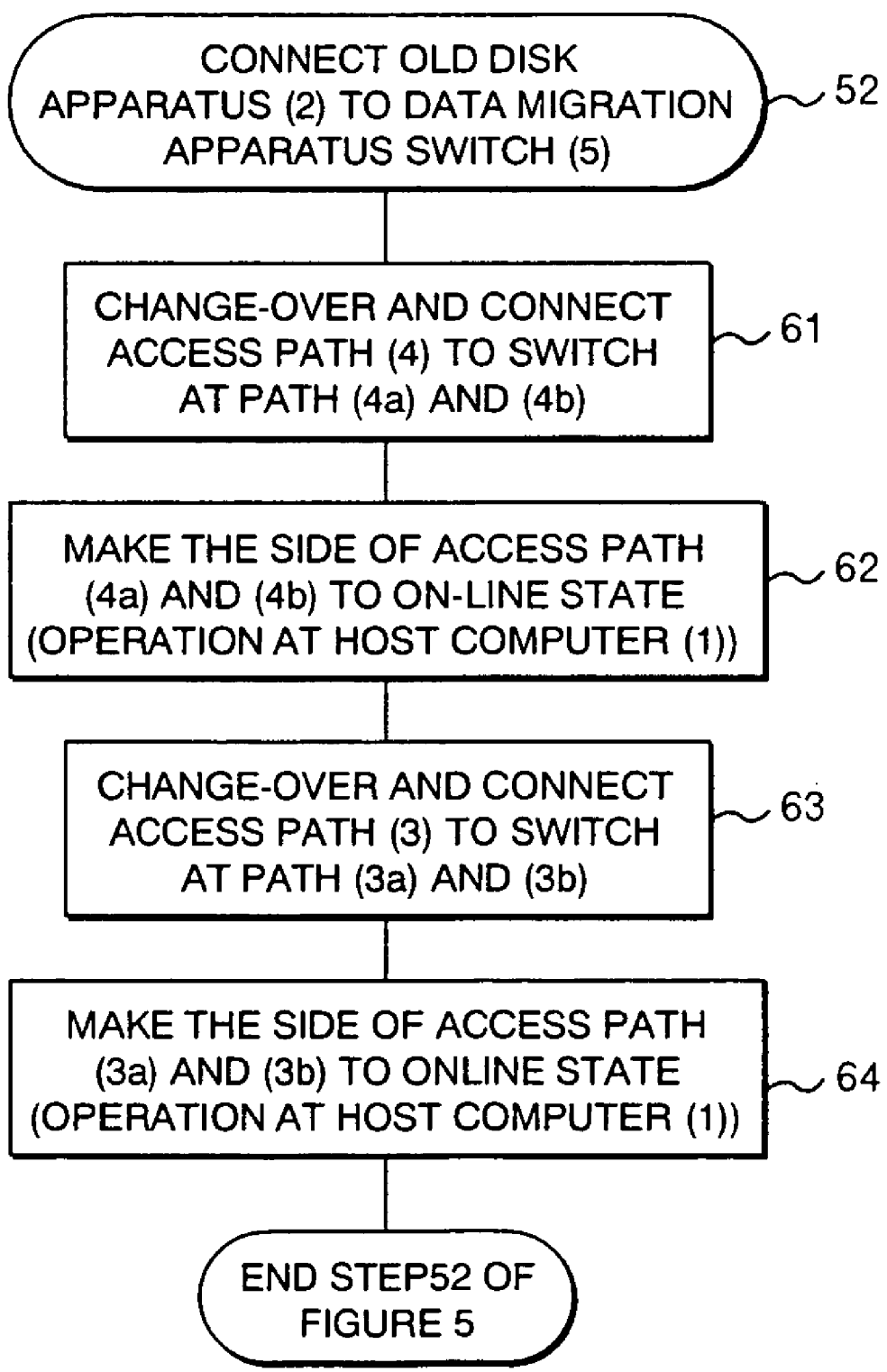
FIG. 6 is a flowchart for explaining operational procedures of connecting the old disk apparatus of the present invention to the switch.

An example of data migration process of the computer system of FIGS. 1A and 1B is explained using flowcharts of FIGS. 5 and 6. FIG. 5 indicates process in which data migration is executed in an order of steps 51, 52, 53, 54, and 55. They are expressed as (step 51), (step 52), . . . , and (step 55) in the latter part of the description. Further, FIG. 6 indicates operator's operational procedures 61 to 64 which are executed at the step 52 of FIG. 5.

Before starting data migration, as shown in FIG. 1A, the host computer 1 accesses the old disk apparatus 2 using the access paths 3 and 4. First of all, the operator operates the system so as to connect the new disk apparatus 6 to the switch 5 via the access paths 7 and 8 (step 51).

Next, in order to connect the old disk apparatus 2 to the switch 5, the system is operated in accordance with the procedures 61 to 64 of FIG. 6 (step 52). The operator changes-over and connects the access path 4 to new access paths 4a and 4b (the procedure 61 of step 52). At this time, the host computer 1 detects changing-over of the access path 4, makes the access path 4 to an offline state, and continues to access the old disk apparatus 2 using the access path 3. Next, the host computer 1 is operated so as to make the access path 4a to an online state (the procedure 62 of step 52).

FIG. 2 indicates the condition of this case. The host computer 1 and the old disk apparatus 2 are connected logically using SCSI data paths 30 and 31. Next, the access path 3 is changed-over and connected to the new access paths 3a and 3b (the procedure 63 of step 52). Next, the host computer 1 is operated so as to make the access path 3a to the online state (the procedure 64 of step 52). Accordingly, the host computer 1, the switch 5, and the old disk apparatus 2 are connected as indicated in FIG. 1B, and the host computer 1 accesses the old disk apparatus 2 via the switch 5.

Next, in step 53 of FIG. 5, process in relation to SCSI reserve migrates to the reserve emulation part 10 from the old disk apparatus 2. To be more precise, the reserve emulation part 10 accesses the old disk apparatus 2 via an internal path 23, checks the reserve condition of the old disk apparatus 2, sets its condition as an initial condition of the reserve emulation part 10, and then releases a reserve condition of the old disk apparatus 2. Then, process of SCSI commands with regard to reserve such as release and reserve received from the host computer and process of controlling access from another host computer (another initiator) for a disk apparatus are executed in the reserve emulation part 10. The reserve condition of the old disk apparatus in the process of this step 53 shall be released before online data migration (step 54) execution. Because, there may be caused trouble condition for a process of reading data from the old disk apparatus 2 when online data migration is executed for the condition in which the old disk apparatus 2 is reserved by a reserve command from the host computer. Therefore, the old disk apparatus can be accessed without reserving by including the reserve emulation part 10 in the upper portion of an online data migration part 12.

Next, the online data migration part 12 copies data from the old disk apparatus 2 to the new disk apparatus 6 (step 54). Here, with reference to FIG. 3, a typical data flow during data migration is explained. The host computer 1 and the old disk apparatus 2 are connected logically via a SCSI data path 32, and the old disk apparatus 2 is continuously accessed from the host computer 1. Further, on a parallel with this case, the online data migration part 12 copies data from the old disk apparatus 2 to the new disk apparatus 6 as indicated in a path 33 of SCSI data.

Next, when online data migration process is completed, the SCSI command control part 11 changes-over SCSI commands, with regard to disk read and write, issued by the host computer 1 to the new disk apparatus 6 (step 55). Here, with reference to FIG. 4, a typical data flow is explained after data migration. As indicated by a SCSI data path 35 of FIG. 4, SCSI commands, with regard to write and read, issued by the host computer 1 is given to the new disk apparatus 6 via the disk interface control part 14 and an internal path 26 from the SCSI command control part 11. The SCSI commands, with regard to write and read, issued by the host computer 1 are not issued to the old disk apparatus 2.

Figure 4:
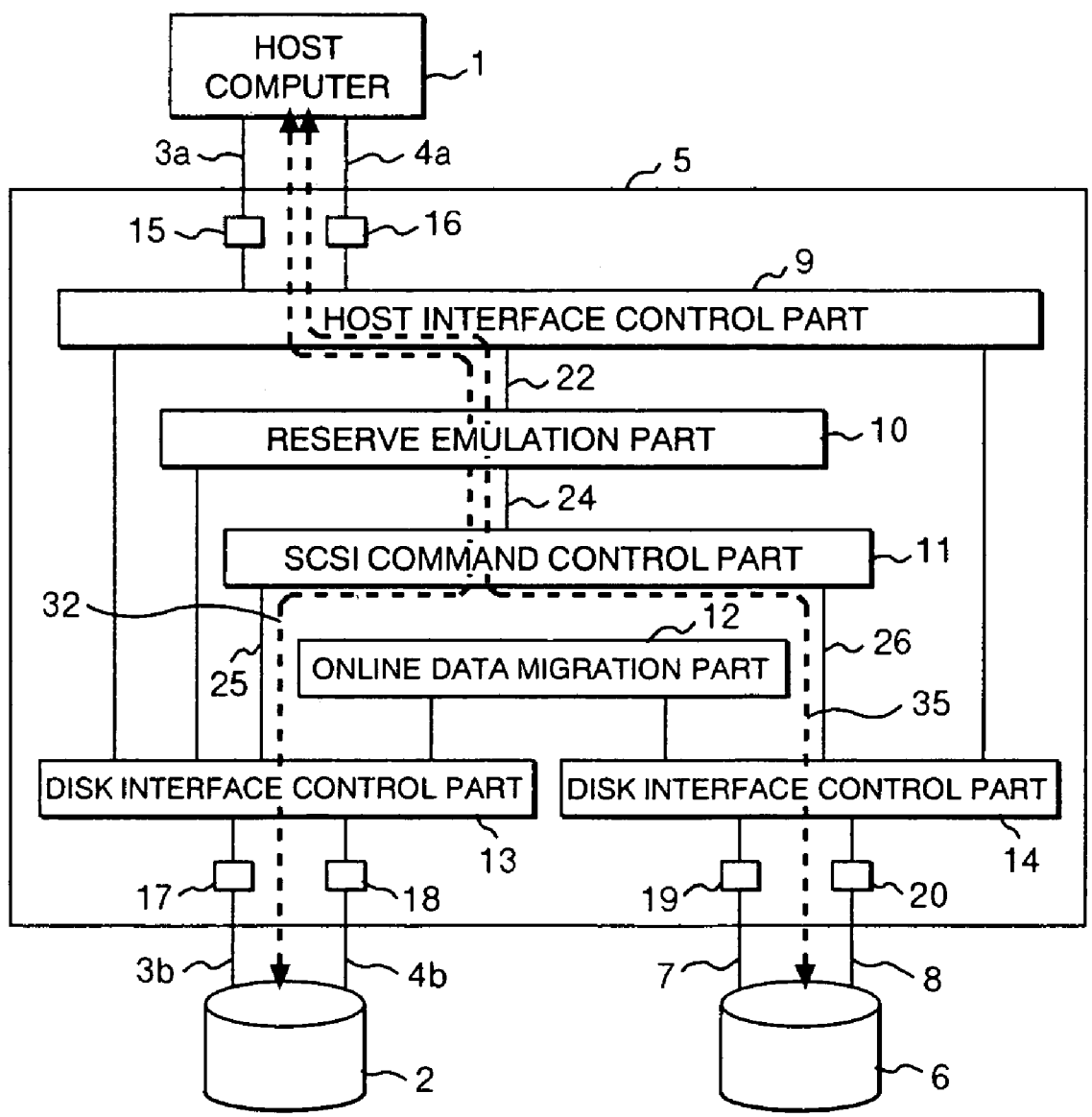
FIG. 4 exemplifies a data flow after online data migration process of the present invention.

The SCSI command control part 11 identifies SCSI commands for identifying the disk apparatuses issued by the host computer 1, i.e., inquiry commands and SCSI commands in relation to mode sense series not specified in the SCSI standard specification, and issues them continuously to the old disk apparatus 2 (SCSI data path 32 of FIG. 4). Accordingly, although process in relation to actual read and write operations is executed in the new disk apparatus 6, data migration can be completed without stopping since the host computer 1 recognizes that the old disk apparatus 2 is continuously connected.

If suchlike data migration is executed by plural host computers, the old magnetic disk apparatus is shared by plural host computers. Further, if plural old magnetic disk apparatuses are connected, plural magnetic disk apparatuses are shared.

FIG. 7 is a SCSI command kind table. In this table, SCSI commands for SCSI command names "Inquiry" (operation codes 12H) and "Mode Sense" (operation codes 1AH) series not specified in the SCSI standard specification are command kinds which shall be set in the disk apparatus inherently. For accessing data after data migration between magnetic disk apparatuses, there has been anxiety in which data access might be negatived after migration by recognizing suchlike command kind inconsistency as disk exchange information disagreement by the host computer. However, in accordance with is the computer system and an interface command control method of the present invention, it was recognized that suchlike inconsistent recognition was avoided and data access after migration was executed steadily.

Figure 8:
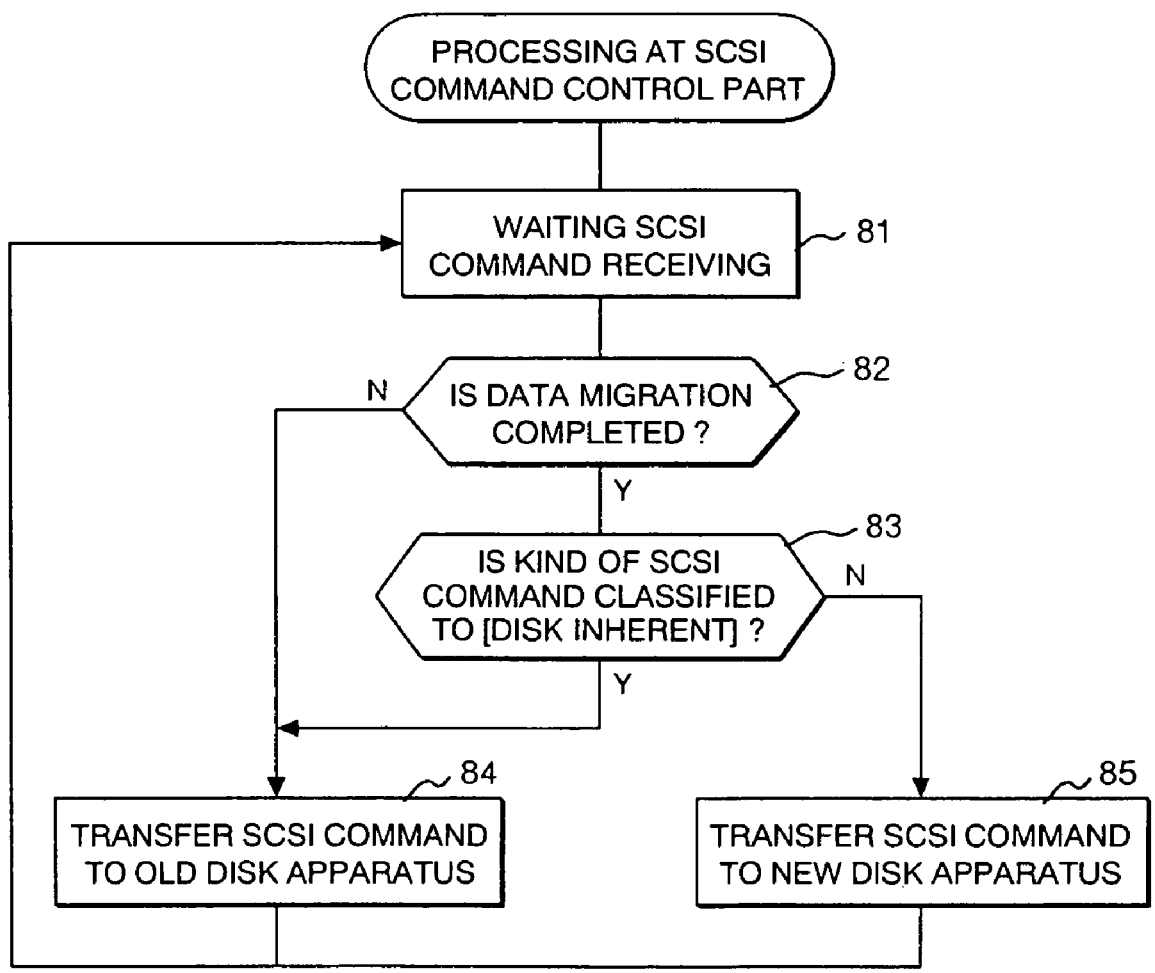
FIG. 8 is a flowchart for identifying whether a SCSI command from the host computer of the present invention is "disk inherency" or not.

FIG. 8 indicates specific procedures for a method of controlling interface commands of the present invention for avoiding this inconsistent recognition.

Figure 9:
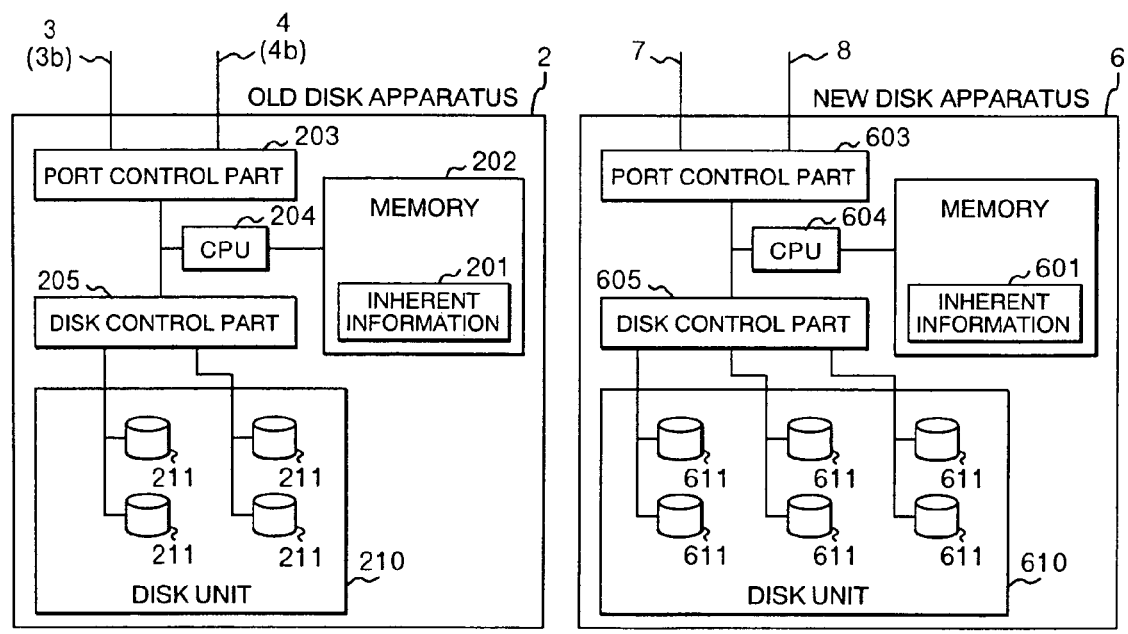
FIG. 9 is a block diagram of disk apparatuses of the computer system of the present invention.

FIG. 9 illustrates a condition in which inherent information is stored as memory, which corresponds to each command kind set in the inherent magnetic disk apparatus of the computer system of the present invention.

In the above mentioned example, the case of utilizing the switch 5 for data migration is explained. The present invention is not limited to this case, but it is also applicable to execute data migration by utilizing the disk apparatus or disk controller (generic term of portions including a disk control part 205, CPU 204, a port control part 203, a memory 202, and inherent information 201 of the old disk apparatus of FIG. 9).

As explained in the above cited, the present invention does not need an access stop to the disk apparatus from the host computer for data migration procedures from the old disk apparatus to the new disk apparatus, and thus non-stop data migration can be made.

Further, fault condition caused by disk apparatus inherent information change when data migration is executed from the old disk apparatus to the new disk apparatus can be avoided and thus the disk apparatus having inconsistent specification can be exchanged without any stopping.

Further, redundancy of access paths among the host computer, the switch, and the disk apparatus can be maintained and thus highly available computer system data migration and operational availability after data migration can be made.

Further, complete non-stop system migration can be made by including the function of simulating reserve process even for the disk apparatus shared by plural host computers.

In this way, the invention is explained concretely based on the embodiments invented by the inventor. The present invention is not limited to the above cited embodiments, but it goes without saying that various modifications can be applied within the scope of the gist of the present invention.

Although data migration has been exemplified as the function of the switch, for example, this data migration can also be applied widely to a disk array (RAID) subsystem including the equivalent function. Further, the old disk apparatus after data migration can be diverted to data storage used by the switch and the disk array sub system.

According to the data migration method of the disk apparatus of the present invention, since the host computer recognizes that the old disk has been connected even during or after executing data migration to the new disk apparatus from the old disk apparatus, effects, in which the host computer does not need to change the definition of the disk apparatus and then tasks on the host computer can be performed continuously, are obtained.

Further, in a system in which the host computer is connected to the old disk apparatus via plural redundant access paths, since the host computer can access the disk apparatus without stopping when data migrate and the host computer can also utilize plural access paths continuously after data migration, effects, in which data migration can be executed without stopping access and protection against the fault of access paths can be maintained, are obtained.

Furthermore, in a cluster system in which plural hosts share the old disk, the effect in which non-stop data can migrate smoothly while the cluster is maintained since exclusion information of the disk apparatus also migrates is obtained.

Furthermore, after data migration, the effect in which the old disk can be diverted to the device for storing other data is obtained.

What is claimed is:

1. A method of controlling data transfer in a switch system coupled to an initiator and a plurality of storage devices, the initiator using logical unit identification information of a logical unit to access the switch system, and each of the storage devices having a plurality of disk drives, the method comprising:

a first status comprising:
receiving data of a first data input request, the first data input request being sent from the initiator and being targeted to the logical unit identification information, and
transferring the data of the first data input request to a first storage device of the storage devices so that the first storage device inputs the data of the first data input request into a storage area of the disk drives of the first storage device;

a second status comprising:
transferring data stored in the first storage device to a second storage device of the storage devices, a third status comprising:
receiving data of a second data input request, the second data input request being sent from the initiator and being targeted to the logical unit identification information, and
transferring the data of the second data input request to the second storage device so that the second storage device inputs the data of the second data input request into a storage area of the disk drives of the second storage device, wherein the second status is conducted between the first status and the third status, and
wherein the switch system controls to allow or deny authorizing a reserve to the initiator based on whether or not another initiator is allowed authorizing the reserve authority of the logical unit of the logical unit identification information.

2. The method of controlling data transfer according to claim 1, wherein the switch system controls to allow or deny authorizing the reserve to the other initiator during at least the second status.

3. The method of controlling data transfer according to claim 1, wherein the switch system controls to allow or deny authorizing the reserve to the initiator based on a command, the command being used to request a reserve and being sent from the initiator.

4. The method of controlling data transfer according to claim 1, wherein the switch system controls to allow authorizing the reserve to the initiator and controls to release the logical unit of the logical unit identification information from the initiator.

5. The method of controlling data transfer according to claim 1, wherein the switch system controls to allow authorizing the reserve to the initiator based on a first command sent from the initiator and controls to release the logical unit of the logical unit identification information from the initiator based on a second command sent from the initiator.

6. The method of controlling data transfer according to claim 1, wherein the switch system controls to allow or deny authorizing the reserve to the initiator based on a Reserve command of SCSI standards.

7. The method of controlling data transfer according to claim 1, wherein the switch system receives and controls a Test Unit Ready command of SCSI standards.

8. The method of controlling data transfer according to claim 1, wherein the switch system receives and controls a Rezero Unit command of SCSI standards.

9. The method of controlling data transfer according to claim 1, wherein the switch system receives and controls a Request Sense command of SCSI standards.

10. The method of controlling data transfer according to claim 1, wherein the switch system receives and controls a Format command of SCSI standards.

11. The method of controlling data transfer according to claim 1, wherein the switch system receives and controls an Inquiry command of SCSI standards.

12. The method of controlling data transfer according to claim 1, wherein the switch system receives and controls a Verify command of SCSI standards.

13. The method of controlling data transfer according to claim 1, wherein the switch system controls to transfer the data stored in the first storage device to the second storage device in a status in which the logical unit is continuously accessed by the initiator.

14. The method of controlling data transfer according to claim 1, wherein the switch system controls to transfer the data stored in the first storage device to the second storage device in a status in which the logical unit is continuously accessed by the initiator, the initiator is allowed authorizing the reserve of the logical unit.

15. The method of controlling data transfer according to claim 1, wherein the switch system controls to transfer the data stored in the first storage device to the second storage device in a status in which the initiator does not need to change the definition of the logical unit and tasks of the initiator can be performed continuously.

16. The method of controlling data transfer according to claim 1, wherein the transferring step, for transferring the data stored in the first storage device to the second storage device, is executed by a data migration function in the switch system.

17. The method of controlling data transfer according to claim 1, wherein the switch system controls to deny authorizing the reserve to the initiator and the another initiator is allowed authorizing the reserve of the logical unit of the logical unit identification information.

18. A method of controlling data transfer in a switch system coupled to an initiator and a plurality of storage devices, the initiator using an identification information to access the switch system, and each of the storage devices having a plurality of disk drives, the method comprising:
controlling to allow or deny reserving a logical unit for the initiator based on whether or not the logical unit is reserved for another initiator;
receiving data of a first data input request, the first data input request being sent from the initiator and being targeted to the identification information;
transferring the data of the first data input request to a first storage device of the storage devices so that the first storage device inputs the data of the first data input request into a storage area of the disk drives of the first storage device;
transferring data stored in the first storage device to a second storage device of the storage devices;
receiving data of a second data input request, the second data input request being sent from the initiator and being targeted to the identification information; and
transferring the data of the second data input request to the second storage device so that the second storage device inputs the data of the second data input request into a storage area of the disk drives of the second storage device.

19. The method of controlling data transfer according to claim 18, wherein the switch system controls to allow or deny to reserve the logical unit for the other initiator during at least the transferring step for transferring data stored in the first storage device to the second storage device.

20. The method of controlling data transfer according to claim 18, wherein the switch system controls to allow or deny reserving the logical unit for the initiator based on a command, the command being used to request a reserve and being sent from the initiator.

21. The method of controlling data transfer according to claim 18, wherein the switch system controls to allow reserving the logical unit for the initiator and controls to release the logical unit from the initiator.

22. The method of controlling data transfer according to claim 18, wherein the switch system controls to allow reserving the logical unit for the initiator based on a first command sent from the initiator and controls to release the logical unit from the initiator based on a second command sent from the initiator.

23. The method of controlling data transfer according to claim 18, wherein the switch system controls to allow or deny reserving the logical unit for the initiator based on a Reserve command of SCSI standards.

24. The method of controlling data transfer according to claim 18, wherein the switch system receives and controls a Test Unit Ready command of SCSI standards.

25. The method of controlling data transfer according to claim 18, wherein the switch system receives and controls a Rezero Unit command of SCSI standards.

26. The method of controlling data transfer according to claim 18, wherein the switch system receives and controls a Request Sense command of SCSI standards.

27. The method of controlling data transfer according to claim 18, wherein the switch system receives and controls a Format command of SCSI standards.

28. The method of controlling data transfer according to claim 18, wherein the switch system receives and controls an Inquiry command of SCSI standards.

29. The method of controlling data transfer according to claim 18, wherein the switch system receives and controls a Verify command of SCSI standards.

30. The method of controlling data transfer according to claim 18, wherein the switch system controls to transfer the data stored in the first storage device to the second storage device in a status in which the logical unit is continuously accessed by the initiator.

31. The method of controlling data transfer according to claim 18, wherein the switch system controls to transfer the data stored in the first storage device to the second storage device in a status in which the logical unit is continuously accessed by the initiator, the initiator being allowed reserving the logical unit.

32. The method of controlling data transfer according to claim 18, wherein the switch system controls to transfer the data stored in the first storage device to the second storage device in a status in which the initiator does not need to change the definition of the logical unit and tasks of the initiator can be performed continuously.

33. The method of controlling data transfer according to claim 18, wherein the transferring step, for transferring the data stored in the first storage device to the second storage device, is executed by a data migration function in the switch system.

34. The method of controlling data transfer according to claim 18, wherein the switch system controls to deny reserving the logical unit for the initiator, if the logical unit is reserved for the another initiator.

35. A method of controlling data transfer in a switch system coupled to an initiator and a plurality of storage devices, the initiator using an identification information to access the switch system, and each of the storage devices having a plurality of disk drives, the method comprising:
controlling to allow or deny reserving a storage target for the initiator;
receiving data of a first data write request, the first data write request being sent from the initiator and being targeted to the identification information;
transferring the data of the first data write request to a first storage device of the storage devices so that the first storage device writes the data of the first data write request into a storage area of the disk drives of the first storage device;
transferring data stored in the first storage device to a second storage device of the storage devices;
receiving data of a second data write request, the second data write request being sent from the initiator and being targeted to the identification information; and
transferring the data of the second data write request to the second storage device so that the second storage device writes the data of the second data write request into a storage area of the disk drives of the second storage device.

36. The method of controlling data transfer according to claim 35, wherein the switch system controls to allow or deny reserving the storage target for the other initiator during at least the transferring step for transferring data stored in the first storage device to the second storage device.

37. The method of controlling data transfer according to claim 35, wherein the switch system controls to allow or deny reserving the storage target for the initiator based on a command, the command being used to request a reserve and being sent from the initiator.

38. The method of controlling data transfer according to claim 35, wherein the switch system controls to allow or deny reserving the storage target for the initiator and controls to release the logical unit from the initiator.

39. The method of controlling data transfer according to claim 35, wherein the switch system controls to allow or deny reserving the storage target for the initiator based on a first command sent from the initiator and controls to release the logical unit from the initiator based on a second command sent from the initiator.

40. The method of controlling data transfer according to claim 35, wherein the switch system controls to allow or deny reserving the storage target for the initiator based on a Reserve command of SCSI standards.

41. The method of controlling data transfer according to claim 35, wherein the switch system receives and controls a Test Unit Ready command of SCSI standards.

42. The method of controlling data transfer according to claim 35, wherein the switch system receives and controls a Rezero Unit command of SCSI standards.

43. The method of controlling data transfer according to claim 35, wherein the switch system receives and controls a Request Sense command of SCSI standards.

44. The method of controlling data transfer according to claim 35, wherein the switch system receives and controls a Format command of SCSI standards.

45. The method of controlling data transfer according to claim 35, wherein the switch system receives and controls an Inquiry command of SCSI standards.

46. The method of controlling data transfer according to claim 35, wherein the switch system receives and controls a Verify command of SCSI standards.

47. The method of controlling data transfer according to claim 35, wherein the switch system controls to transfer the data stored in the first storage device to the second storage device in a status in which the storage target of the identification information is continuously accessed by the initiator.

48. The method of controlling data transfer according to claim 35, wherein the switch system controls to transfer the data stored in the first storage device to the second storage device in a status in which the storage target of the identification information is continuously accessed by the initiator, the initiator being allowed reserving the storage target.

49. The method of controlling data transfer according to claim 35, wherein the switch system controls to transfer the data stored in the first storage device to the second storage device in a status in which the initiator does not need to change the definition of the storage target and tasks of the initiator can be performed continuously.

50. The method of controlling data transfer according to claim 35, wherein the transferring step, for transferring the data stored in the first storage device to the second storage device, is executed by a data migration function in the switch system.

51. The method of controlling data transfer according to claim 35, wherein the switch system controls to deny reserving the storage target for the initiator, if the storage target is reserved for another initiator.

52. A method of controlling data transfer in a switch system coupled to an initiator and a plurality of disk array apparatuses, each of the disk array apparatuses comprising a disk controller and a plurality of disks, the method comprising:

receiving data of a first data write request, the first data write request being sent from the initiator for writing data to a storage area, as identified by identification information;

transferring the data of the first data write request to a first disk array apparatus of the disk array apparatuses so that the first disk array apparatus writes the data of the first data write request into at least a portion of the disks of the first disk array apparatus;

transferring data stored in the first disk array apparatus to a second disk array apparatus of the disk array apparatuses;

receiving data of a second data write request, the second data write request being sent from the initiator for writing data to the storage area;

transferring the data of the second data write request to the second disk array apparatus so that the second disk array apparatus writes the data of the second data write request into at least a portion of the disks of the second disk array apparatus; and controlling to allow or deny reserving the storage area for another initiator based on whether or not the storage area is reserved for the initiator.

53. The method of controlling data transfer according to claim 52, wherein the switch system controls to allow or deny reserving the storage area for the another initiator during at least the transferring step for transferring data stored in the first disk array apparatus to the second disk array apparatus.

54. The method of controlling data transfer according to claim 52, wherein the switch system controls to allow or deny reserving the storage area for the another initiator based on a command, the command being used to request a reserve and being sent from the another initiator.

55. The method of controlling data transfer according to claim 52, wherein the switch system controls to allow reserving the storage area for the initiator and controls to release the storage area from the initiator.

56. The method of controlling data transfer according to claim 52, wherein the switch system controls to allow reserving the storage area for the initiator based on a first command sent from the initiator and controls to release the storage area from the initiator based on a second command sent from the initiator.

57. The method of controlling data transfer according to claim 52, wherein the switch system controls to allow or deny reserving the storage area for the another initiator based on a Reserve command of SCSI standards.

58. The method of controlling data transfer according to claim 52, wherein the storage area is a logical unit.

59. The method of controlling data transfer according to claim 52, wherein the controlling step, for controlling to allow or deny reserving the storage area for another initiator, is a control process controlling to allow or deny authorizing a reserve authority of the storage area to the another initiator based on whether or not the initiator is allowed authorizing the reserve of the storage area.

60. The method of controlling data transfer according to claim 52, wherein the switch system controls to deny reserving the storage area for another initiator, if the storage area is reserved for the initiator.

61. The method of controlling data transfer according to claim 52, wherein the switch system controls to transfer the data storage in the first disk array apparatus to the second disk array apparatus in a status in which the storage area is continuously accessed by the initiator.

62. The method of controlling data transfer according to claim 52, wherein the switch system controls to transfer the data stored in the first disk array apparatus to the second disk array apparatus in a status in which the storage area is continuously accessed by the initiator, the initiator being allowed reserving the storage area.

63. The method of controlling data transfer according to claim 52, wherein the switch system controls to transfer the data stored in the first disk array apparatus to the second disk array apparatus in a status in which the initiator does not need to change the definition of the storage area and tasks of the initiator can be performed continuously.

64. The method of controlling data transfer according to claim 52, wherein the storage area is a logical unit, and wherein the switch system controls to transfer the data stored in the first disk array apparatus to the second disk array apparatus in a status in which the logical unit is continuously accessed by the initiator, the logical unit being reserved for the initiator.

65. The method of controlling data transfer according to claim 52, wherein the transferring step, for transferring the data stored in the first disk array apparatus to the second disk array apparatus, is executed by a data migration function in the switch system.

66. A switch system coupled to a initiator and a plurality of disk array apparatuses, each of the disk array apparatuses comprising a disk controller and a plurality of disks, the switch system comprising:

at least one first port coupled to the initiator;

at least one second port coupled to the disk array apparatuses; and at least one controller controlling to allow or deny reserving a storage area, as identified by identification information, for another initiator based on whether or not the storage area is reserved for the initiator, wherein the first port receives data of a first data write request, the first data write request being sent from the initiator for writing data to the storage area as identified by identification information, wherein the second port transfers the data of the first data write request to a first disk array apparatus of the disk array apparatuses so that the first disk array apparatus writes the data of the first data write request into at least a portion of the disks of the first disk array apparatus, wherein the second port transfers data stored in the first disk array apparatus to a second disk array apparatus of the disk array apparatuses, wherein the first port receives data of a second data write request, the second data write request being sent from the initiator for writing data to the storage area, and wherein the second port transfers the data of the second data write request to the second disk array apparatus so that the second disk array apparatus writes the data of the second data write request into at least a portion of the disks of the second disk array apparatus.

67. The switch system according to claim 66, wherein the controller controls to allow or deny reserving the storage area for the another initiator during that the second port transfers the data storage in the first disk array apparatus to the second disk array apparatus.

68. The switch system according to claim 66, wherein the controller controls to allow or deny reserving the storage area for the another initiator based on a command, the command being used to request a reserve and being sent from the another initiator.

69. The switch system according to claim 66, wherein the controller controls to allow reserving the storage area for the initiator and controls to release the storage area from the initiator.

70. A switch system coupled to a initiator and a plurality of disk array apparatuses, each of the disk array apparatuses comprising a disk controller and a plurality of disks, the switch system comprising:

at least one first port coupled to the initiator; and at least one second port coupled to the disk array apparatuses;

wherein the first port receives data of a first data write request, the first data write request being sent from the initiator for writing data to a storage area as identified by identification information, wherein the second port transfers the data of the first data write request to a first disk array apparatus of the disk array apparatuses so that the first disk array apparatus writes the data of the first data write request into at least a portion of the disks of the first disk array apparatus, wherein the second port transfers data stored int he first disk array apparatus to a second disk array apparatus of the disk array apparatuses, wherein the first port receives data of a second data write request, the second data write request being sent from the initiator for writing data to the storage area, wherein the second port transfers the data of the second data write request to the second disk array apparatus so that the second disk array apparatus writes the data of the second data write request into at least a portion of the disks of the second disk array apparatus, and wherein the switch system controls to deny reserving the storage area for another initiator, if the storage area is reserved for the initiator.

71. The switch system according to claim 70, wherein the switch system controls to allow reserving the storage area for the initiator based on a first command sent from the initiator and controls to release the storage area from the initiator based on a second command sent from the initiator.

72. The switch system according to claim 70, wherein the switch system controls to allow or deny reserving the storage area for the another initiator based on a Reserve command of SCSI standards.

73. The switch system according to claim 70, wherein the storage area is a logical unit.

74. The switch system according to claim 70, wherein the switch system controls to deny authorizing a reserve authority of the storage area to the another initiator based on that the initiator is authorized the reserve authority of the storage area, if the switch system controls to deny reserving the storage area for the another initiator.

75. The switch system according to claim 70, wherein the switch system controls to transfer the data stored in the first disk array apparatus to the second disk array apparatus in a status in which the storage area is continuously accessed by the initiator, the storage area being reserved for the initiator.

76. The switch system according to claim 70, wherein the switch system controls to transfer the data stored in the first disk array apparatus to the second disk array apparatus in a status in which the initiator does not need to change the definition of the storage area and tasks of the initiator can be performed continuously.

77. The switch system according to claim 70, wherein the storage area is a logical unit, and wherein the switch system controls to transfer the data stored in the first disk array apparatus to the second disk array apparatus in a status in which the logical unit is continuously accessed by the initiator, the logical unit being reserved for the initiator.

78. The switch system according to claim 70, wherein the transferring process, for transferring the data stored in the first disk array apparatus to the second disk array apparatus, is executed by a data migration function in the switch system.

79. A switch system coupled to a initiator and a plurality of disk array apparatuses, each of the disk array apparatuses comprising a disk controller and a plurality of disks, the switch system comprising:

at least one first port coupled to the initiator;

at least one second port coupled to the disk array apparatuses; and at least one reserve emulation control part controlling to allow or deny reserving a storage area, as identified by identification information, for the initiator, wherein the first port receives data of a first data write request, the first data write request being sent from the initiator for writing data to the storage area as identified by identification information, wherein the second port transfers the data of the first data write request to a first disk array apparatus of the disk array apparatuses so that the first disk array apparatus writes the data of the first data write request into at least a portion of the disks of the first disk array apparatus, wherein the second port transfers data stored in the first disk array apparatus to a second disk array apparatus of the disk array apparatuses, wherein the first port receives data of a second data write request, the second data write request being sent from the initiator for writing data to the storage area, and wherein the second port transfers the data of the second data write request to the second disk array apparatus so that the second disk array apparatus writes the data of the second data write request into at least a portion of the disks of the second disk array apparatus.

80. The switch system of controlling data transfer according to claim 79, wherein the reserve emulation part controls to deny reserving the storage area for another initiator, if the storage area is reserved for the initiator.

81. The switch system of controlling data transfer according to claim 79, wherein the switch system controls to transfer the data stored in the first disk array apparatus to the second disk array apparatus in a status in which the storage area is continuously accessed by the initiator.

* * * * *